United States Patent [19]

Lubenstein et al.

[11] 4,431,376
[45] Feb. 14, 1984

[54] AIRFOIL SHAPE FOR ARRAYS OF AIRFOILS

[75] Inventors: Joseph H. Lubenstein, West Hartford; Brian A. Robideau, Glastonbury; Alan K. Ross, Vernon, all of Conn.

[73] Assignee: United Technologies Corporation, Hartford, Conn.

[21] Appl. No.: 200,800

[22] Filed: Oct. 27, 1980

[51] Int. Cl.³ .............................................. B63H 1/26
[52] U.S. Cl. ............................ 416/223 A; 416/223 R; 416/DIG. 2
[58] Field of Search ............... 416/223 A, 223 R, 243, 416/DIG. 2; 415/181

[56] References Cited

U.S. PATENT DOCUMENTS

| | | | |
|---|---|---|---|
| 3,270,953 | 9/1966 | Jerie | 416/223 A |
| 4,012,172 | 3/1977 | Schwaar | 416/223 A |

FOREIGN PATENT DOCUMENTS

| | | | |
|---|---|---|---|
| 2225599 | 12/1973 | Fed. Rep. of Germany | 416/243 |
| 266475 | 7/1976 | U.S.S.R. | 416/DIG. 2 |

*Primary Examiner*—Harvey C. Hornsby
*Assistant Examiner*—Shewen Bian
*Attorney, Agent, or Firm*—Gene D. Fleischhauer

[57] ABSTRACT

A flow directing assembly 14 having an airfoil section or shape 28 of the type adapted for use in an axial flow gas turbine engine is disclosed. The cambered meanline MCL of the airfoil shape is formed of a front circular arc FA and a rear circular arc RA. A thickness distribution TD is applied to the meanline to form the convex suction surface 20 and the concave pressure surface 22. The airfoil section exhibits good aerodynamic performance as compared with an equivalent circular arc airfoil in a transonic flow field. A method for making the airfoil shape is disclosed. The method includes the steps of: forming a cambered meanline of two circular arcs; forming a thickness distribution about the conical chord line $B_l$; and applying thickness distribution to the cambered meanline such that a portion of the suction surface is stretched and a portion of the pressure surface is compressed.

8 Claims, 10 Drawing Figures

FIG. 10

AIRFOIL SHAPE FOR ARRAYS OF AIRFOILS

DESCRIPTION

1. Technical Field

This invention relates to axial flow rotary machines and particularly to transonic airfoils for use in such a machine.

2. Background Art

Axial flow rotary machines typically have arrays of airfoils extending across a flow path for working medium gases. The airfoils of each array receive work from the working medium gases or do work on the working medium gases by turning the flow. As the gases pass through the array, the gases may experience shock waves and separation of the boundary layer of the gases from adjacent airfoil surfaces. These phenomena cause aerodynamic losses. The losses limit the stage efficiency of the airfoils. The losses are of particular concern in a transonic flow field, i.e. any flow field which contains regions of subsonic and supersonic local velocity in juxtaposition. A discussion of this subject is available in Wu and Moulden "A Survey of Transonic Aerodynamics", AIAA Paper No. 76-326, presented at the AIAA Ninth Fluid and Plasma Dynamics Conference, San Diego, California, 1976.

One way to reduce the losses in a transonic flow field is to optimize the contour of the airfoil. This approach was emphasized during the last two decades. A result of such work found expression in U.S. Pat. No. 3,952,971 to Whitcomb entitled "Airfoil Shape for Flight at Subsonic Speeds". The Whitcomb patent deals with an isolated airfoil having no internal or guided flow. However, this patent is an example of an improvement in aerodynamics which results from contouring the blade surface to optimize the performance of the blade.

Scientists and engineers are also interested in improving the performance of arrays of airfoils by contouring adjacent airfoil surfaces. Generally the efforts have fallen into two areas: one, attempting to precisely define the contours of each airfoil section at almost every point to optimize the flow relationship between the airfoil and the working medium gas; the other, generating airfoils having simple shapes which have better flow characteristics than conventional shapes. Examples of both types of airfoil sections are discussed in Stephens "Application of Supercritical Airfoil Technology to Compressor Cascades: Comparison of Theoretcal and Experimental Results", AIAA Paper No. 78-1138, presented at the AIAA Eleventh Fluid and Plasma Dynamics Conference, Seattle, Washington, 1978.

Airfoils having sophisticated shapes such as those made by the first method are difficult an expensive to design and very expensive to fabricate. Airfoils made by the second method, including double circular arc airfoils and multiple circular arc airfoils, are relatively simple to design and fabricate but are not as aerodynamically efficient as those designed by the first method. Accordingly, interest continues in developing an airfoil having a shape which is relatively simple to generate and yet which exhibits good aerodynamic flow performance in a transonic flow field.

DISCLOSURE OF INVENTION

According to the present invention, an airfoil section has a cambered meanline, a suction surface and a pressure surface defined by variables which are a function of the location of the first covered section.

In accordance with the present invention, an airfoil section is fabricated by: establishing a cambered meanline having a first arc and a second arc tangentially intersecting the first arc at a translation point; establishng a conical chord line extending between the leading edge and the trailing edge of the meanline; establishing a thickness distribution about the conical chord line; superimposing the thickness distribution on the cambered mean line to form a suction surface and a pressure surface.

A primary feature of the present invention is a conical airfoil section having a contoured suction surface and a contoured pressure surface. Another feature is the location of the maximum thickness of the airfoil section, the ratio of the front camber angle $\theta_f^*$ to the total camber angle $\theta_t^*$, the ratio of the length $b_f$ of the front chord to the length $b_t$ of the conical chord line, and the distance Tzn of the suction surface and the pressure surface from the cambered meanline.

A principal advantage of the present invention is the good aerodynamic performance of the airfoil section in a transonic flow field as compared with circular arc airfoil sections. Separation of the boundary layer and the resultant aerodynamic losses are suppressed by controlling the rate of diffusion along the suction surface. Another advantage is the simple method for generating the shape of the airfoil as compared with airfoil shapes generated by point by point analysis of the flow field.

The foregoing and other objects, features and advantages of the present invention will become more apparent in the light of the following detailed description of the preferred embodiment thereof as shown in the accompanying drawing.

BEST MODE FOR CARRYING OUT THE INVENTION

Figure 1:
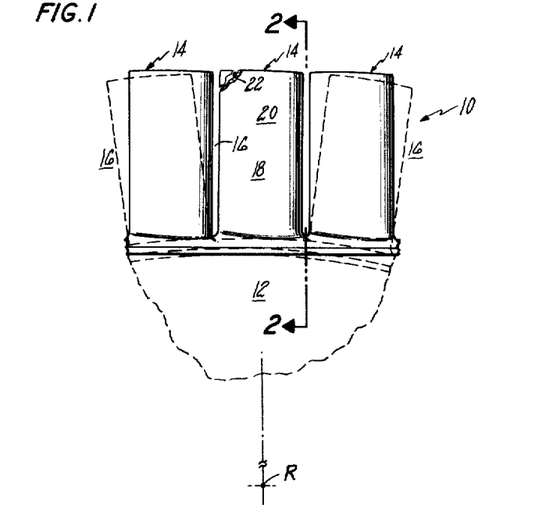
FIG. 1 is a developed view of a portion of a flow directing assembly of a gas turbine engine.

A gas turbine engine embodiment of a rotary machine is illustrated in FIG. 1. A portion of a flow directing assembly such as a compressor rotor assembly 10 of the engine is shown. The broken lines show the embodiment in an undeveloped view. The solid lines show the embodiment in the developed view. The rotor assembly includes a rotor disk 12 having an axis of rotation R. A plurality of rotor blades as represented by the rotor blades 14 extend outwardly from the rotor disk. A flow path 16 for working medium gases extends between the adjacent rotor blades. Each blade has an airfoil 18 extending outwardly across the working medium flow path. Each airfoil has a convex surface or side such as suction surface 20 and a concave surface or side such as pressure surface 22.

Figure 2:
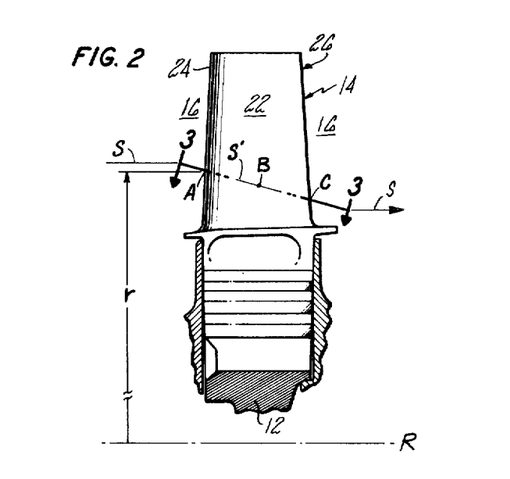
FIG. 2 is a side elevation view of a rotor blade taken along the line 2—2 as shown in FIG. 1.

As illustrated in FIG. 2, the suction surface 20 and the pressure surface 22 of each airfoil 18 are joined together at a leading edge 24 and a trailing edge 26. An imaginary streamline S in the flow path is adjacent to each airfoil. An imaginary point A lies on the leading edge of each airfoil along the streamline S. Point A has a radius r about the axis R of the engine. Similarly, an imaginary point B lies on the suction side and an imaginary point C lies on the trailing edge along the streamline S. The three points define a section plane S' (3—3). The plane S' passes through each airfoil and forms a conical airfoil section 28.

Figure 3:
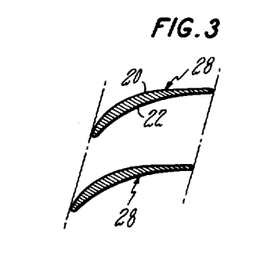
FIG. 3 is a sectional view of twl adjacent airfoil sections taken along the line 3—3 of FIG. 2.

FIG. 3 is a sectional view of two adjacent airfoil sections 28 taken along the line 3—3 of FIG. 2.

Figure 4:
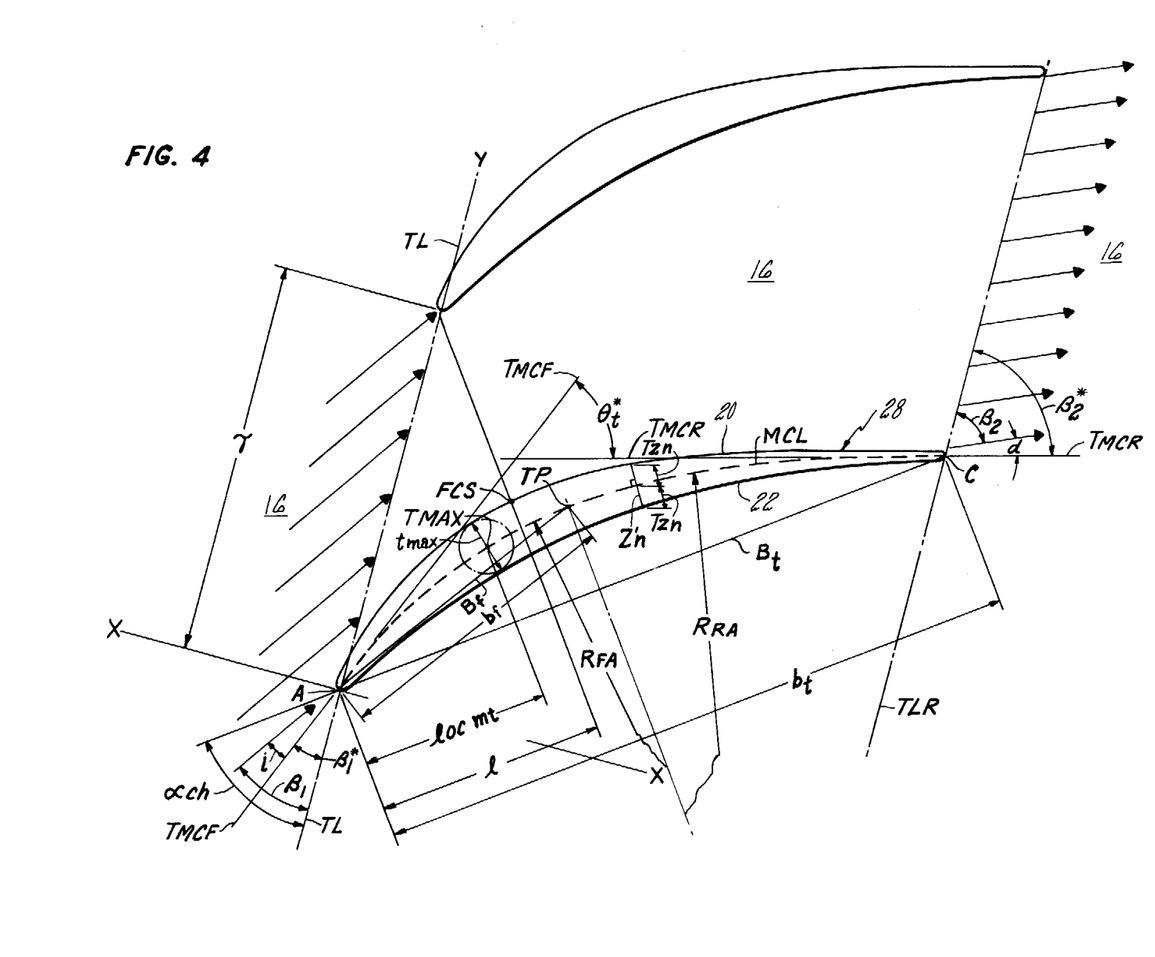
FIG. 4 is an enlarged view of the sectional view of FIG. 3.

FIG. 4 is an enlarged view of the sectional view of FIG. 3. The conical chord line $B_t$ is a straight line connecting point A on the leading edge with point C on the trailing edge. The conical chord line $B_t$ has a length $b_t$. A mean camber line such as the cambered meanline MCL connects the point A on the leading edge and the point C on the trailing edge. The suction surface 20 and pressure surface 22 are each spaced a distance Tzn from the cambered meanline along a line Z'n perpendicular to the cambered meanline MCL.

A forward tangent line TL, tangent to the path of rotation of point A about the axis of rotation R, provides a reference axis (y-axis) for measuring angles and distances. A rear tangent line TLR is parallel to the tangent line TL and passes through point C. A plane passing through the axis of rotation R intersects the plane S at a second reference line, the x-axis. Tau ($\tau$) is the distance between airfoil sections 28 measured along TL. An alpha chord angle $\alpha_{ch}$ is the angle between the tangent line TL and the conical chord line $B_t$.

An imaginary point FCS is the location of the first covered section. A distance l is the distance from point FCS to point A measured along the conical chord line $B_t$. The distance l is equal to the distance tau $\tau$ multiplied by the quantity the sine of the angle ninety degrees minus the alpha chord angle $l=\tau.\sin(90-\alpha_{ch})$. A normalized distance $L_{fcs}$ to the first covered section is the distance l divided by the distance $b_t$ (length of the conical chord line $B_t$) ($L_{fcs}=1/b_2$).

The airfoil has a maximum thickness $t_{max}$. The location TMAX of maximum thickness is on the cambered meanline MCL. A circle $T_{max}$ having a radius $t_{max}/2$ is tangent to the suction surface 20 and the pressure surface 22. The length loc mt to the location of maximum thickness is measured along the conical chord line $B_t$.

The working medium gas flowing along the working medium flow path 16 approaches the airfoil section 28 at an angle $\beta_1$ to the tangent line TL. The cambered mean line MCL has a tangent line $T_{MCF}$ at the leading (front) edge. The angle between the tangent line $T_{MCF}$ and the tangent line TL is the inlet metal angle $\beta_1^*$. Thus, the tangent line $T_{MCF}$ intersects the tangent line TL at an inlet metal angle $\beta_1^*$. The difference between the angle $\beta_1^*$ and the angle $\beta_1$ is the incidence angle i. As shown in FIG. 4 the incidence angle i is negative.

The working medium gas leaves the airfoil section at an angle $\beta_2$ to the rear tangent line TLR. The cambered meanline has a tangent line $T_{MCR}$ at the trailing (rear) edge. The angle between the tangent line $T_{MCR}$ and the rear tangent line TLR is the exit metal angle $\beta_2^*$. Thus, the tangent line $T_{MCR}$ intersects the tangent line TL at an exit metal angle $\beta_2^*$. The difference between the angle $\beta_2^*$ and the angle $\beta_2$ is the deviation angle d.

Figure 5:
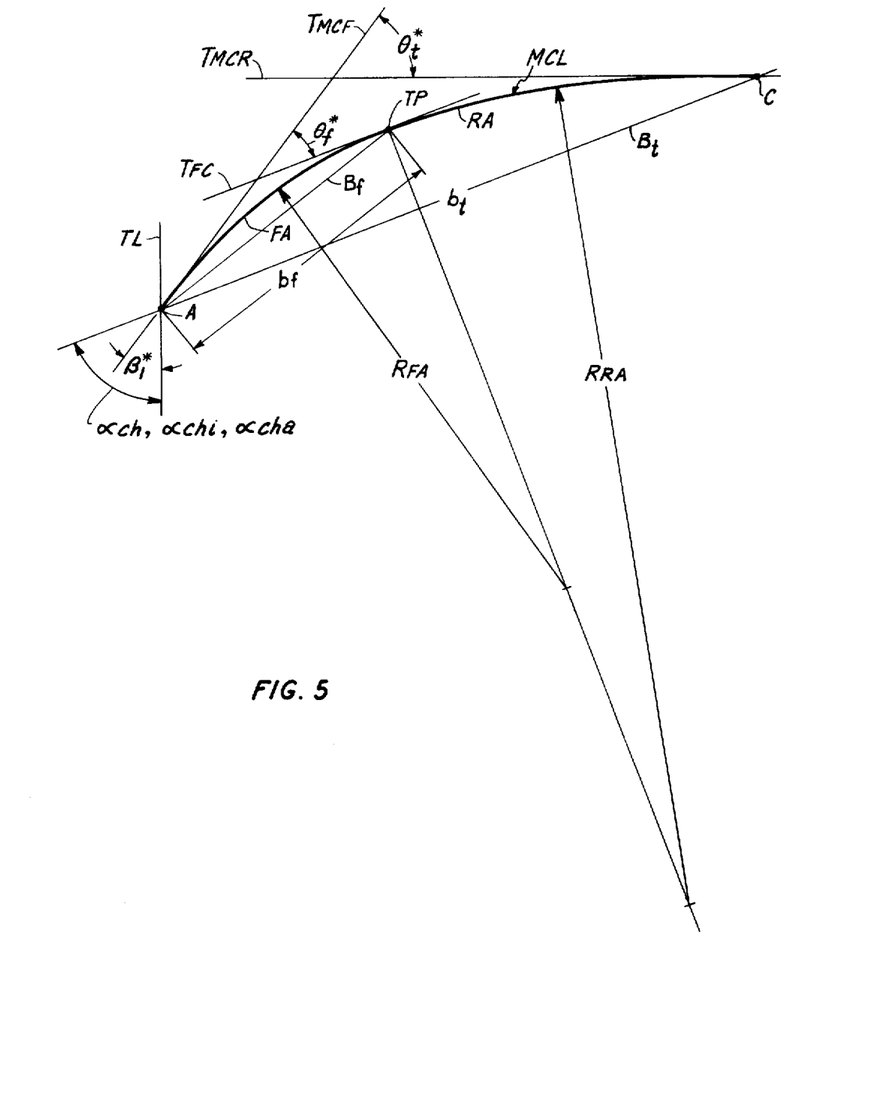
FIG. 5 is a diagrammatic illustration of the cambered meanline of the conical airfoil section of FIG. 4.

As shown in FIG. 5, a total camber angle $\theta_t^*$ is the angle between the tangent line $T_{MCF}$ at the leading edge and the tangent line $T_{MCR}$ at the trailing edge. The total camber angle $\theta_t^*$ is the measure of the curve of the cambered meanline and the airfoil section.

The cambered meanline MCL is a double circular arc having two circular arcs such as a front arc FA and a rear arc RA. The front arc FA has a radius of curvature $R_{FA}$. The rear arc RA has a radius of curvature $R_{RA}$. The front arc FA is tangent to the rear arc at a point of intersection. This point of intersection is the transition point TP of the airfoil section. A tangent line $T_{FC}$ is tangent to both arcs at the transitiion point. A front camber angle $\theta_f^*$ is the angle between the tangent line $T_{FC}$ and the tangent line $T_{MCF}$. A front camber angle $\theta_f^*$ is a measure of the curve of the front arc FA. A front conical chord line $B_f$ extends between the point A on the leading edge and the transition point TP. The front chord line has a length $b_f$.

Figure 6:
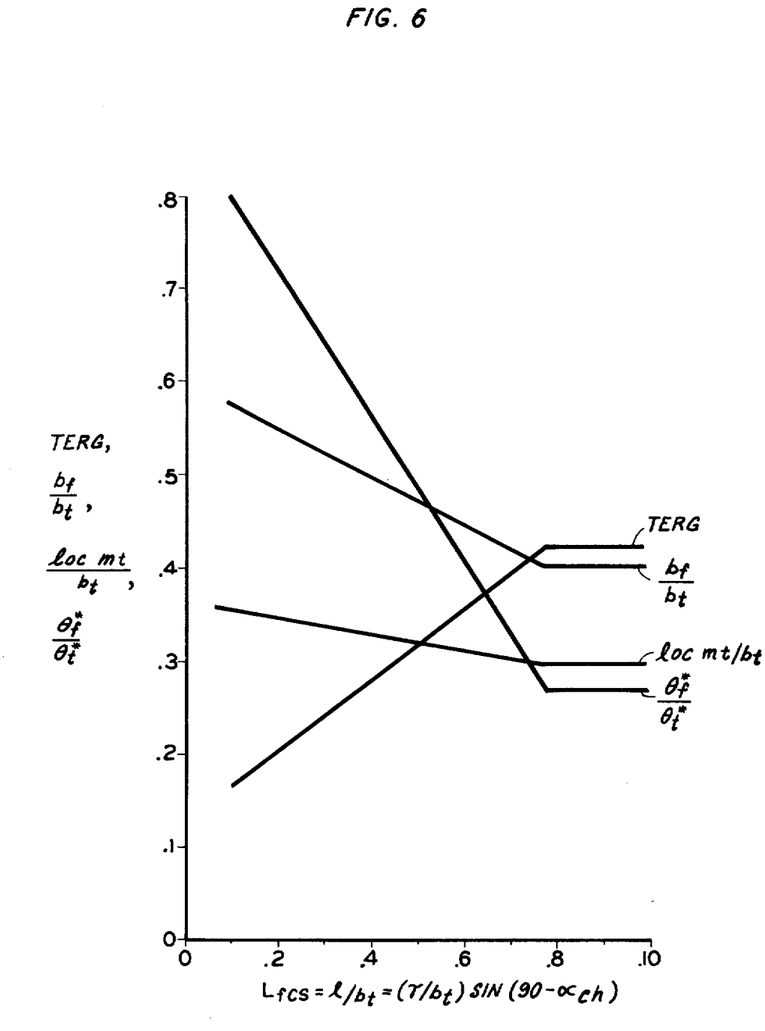
FIG. 6 is a graphical representation of the relationship of several physical parameters of the airfoil section as a function of the normalized length to the first covered section $(\tau/b_f \sin(90-\alpha_{ch}))$.

FIG. 6 is a graphical representation of the relationship of several physical parameters which describe the airfoil section as a function of the normalized length $L_{fcs}$ to the first covered section ($L_{fcs}=1/b_t$). The normalized length $L_{fcs}$ is a function of both the gap $\tau$ to chord $b_t$ ratio ($\tau/b_t$) and the alpha chord angle $\alpha_{ch}$. More particularly $L_{fcs}$ is equal to the distance l from the tangent line TL to the first covered section as measured along the conical chord line $B_t$, the distance l being equal to the distance $\tau$ multiplied by the quantity the sine of the angle 90° minus the alpha chord angle divided by the quantity $b_t$, the length of the conical chord line $B_t$. The relationship is expressed mathematically $1/b_t=\tau/b_t.\sin(90-\alpha_{ch})$. The equations approximately describing this relationship are:

$$\frac{\theta^*_f}{\theta^*_t} = .87 - .77\, L_{fcs},\ 0 < L_{fcs} \leq .77;\ \frac{\theta^*_f}{\theta^*_t} = .27,$$

$$.77 < L_{fcs} < 1.0;\ \frac{loc\ mt}{b_t} = .367 - .087\, L_{fcs},\ 0 < L_{fcs} \leq .77;$$

$$\frac{loc\ mt}{b_t} = .3,\ .77 < L_{fcs} < 1.0;\ \frac{b_f}{b_t} = .61 - .26\, L_{fcs},$$

$$0 < L_{fcs} \leq .77;\ \frac{b_f}{b_t} = .40;\ .77 < L_{fcs} < 1.0;$$

$$TERG = .129 + .384\, L_{fcs},\ 0 < L_{fcs} \leq .77;$$

$$TERG = .425,\ .77 < L_{fcs} < 1.0.$$

Thus, from FIG. 6 which embodies these equations, the ratio of the front camber angle $\theta_f^*$ to the total camber angle $\theta_t^*$ is related to both the alpha chord angle $\alpha_{ch}$ and the gap to chord ratio $\tau/b_t$ by the curve $\theta_f^*$ divided by $\theta_t^*$. Similarly, the ratio between the length loc mt to the location of maximum thickness and the length $b_t$ of the conical chord line $B_t$ is related to both the alpha chord angle $\alpha_{ch}$ and the gap to chord ratio $\tau/b_t$ by the curve loc mt/$b_t$. The ratio of the length $b_f$ of the front chord $B_f$ to the length $b_t$ of the conical chord line $B_t$ is related to both the alpha chord angle $\alpha_{ch}$ and the gap to chord ratio $\tau/b_t$ by curve $b_f/b_t$. Similarly, the relationship for the dimensionless quantity TERG is related to the alpha chord angle $\alpha_{ch}$ and the gap to chord ratio $\tau/b_t$ by the curve TERG. The quantity TERG is used in determining the distances Tzn.

The steps of the method for forming the airfoil section 28 are summarized in this paragraph as steps A, B, C and D. These steps are set forth in more detail in the following paragraphs. The method for forming the airfoil section 28 begins with step A (FIG. 5), establishing the cambered meanline MCL such that the meanline has a first arc, such as the front arc FA, and a second arc, such as rear arc RA. The first arc and the second arc are tangent to each other at the transition point TP. The front arc has a leading end such as the leading edge 24 and the rear arc has a trailing end such as the trailing edge 26. Step A includes establishing a conical chord line $B_t$ extending between the leading end and the trailing end of the cambered meanline MCL. The second step is step B (FIG. 7), establishing a thickness distribution TD about the conbical chord line $b_t$. The third step is C (FIG. 9) superimposing the thickness distribution on the cambered meanline. Imposing a thickness distribution TD generated about the conical chord line on a curved line causes the thickness distribution to stretch chordwisely on the convex or suction side and to compress chordwisely on the concave or pressure side. The resulting airfoil section has a desirable separation characteristic in a transonic aerodynamic flow field. The fourth step is step D. In step D, the airfoil section is completed by forming an airfoil section having the desired contours. These steps are explored in more detail below.

Preliminary design based on aerodynamic and structural considerations establishes the following values: the length of the conical chord line $B_t$; the magnitude of the inlet metal angle $\beta_1^*$, the magnitude of the total camber angle $\theta_t^*$; the gap distance between adjacent circumferentially spaced airfoil sections tau $\tau$; and the maximum thickness of the airfoil section $t_{max}$. Referring to FIG. 4 and FIG. 5, the first step is step:

A. establishing a cambered meanline having a concave side and a convex side and having a first arc, such as the front arc FA, a second arc, such as the rear arc Ra, and a transition point TP between the first arc and the second arc, the first arc being tangent to the second arc at said transition point TP by Aa. determining an initial value for the alpha chord angle ($\alpha_{chi}$) which is equal to the sum of the inlet metal angle ($\beta_1^*$) and one-half of the total camber angle ($\theta_t^*/2$), ($\alpha_{chi} = \beta_1^* + \theta_t^*/2$,)

Ab. setting the value of the alpha chord angle $\alpha_{ch}(\alpha_{ch} = \alpha_{chi})$, Ac. determining a distance l from the tangent line TL to the first covered section as measured along the conical chord line $B_t$, the distance l being equal to the distance tau $\tau$ multiplied by the quantity the sine of the angle ninety degrees minus the alpha chord angle ($l = \tau \cdot \sin(90 - \alpha_{ch})$), Ad. determining the normalized distance $L_{fcs}$ to the first covered section by dividing the distance l by the distance $b_t$, Ae. obtaining the ratio of the length $b_f$ of the front chord line $B_f$ to the length $b_t$ of the conical chord line $B_t$ ($b_f/b_t$) and the ratio of the front camber angle ($\theta_f^*$) to the total camber angle $\theta_t^*(\theta_f^*/\theta_t^*)$ from FIG. 6 at the value $L_{fcs}$ of the normalized distance to the first covered section, Af. establishing the location of the first arc such that the arc passes through the leading edge using the values known ($b_t$, $\theta_t^*$, $\beta_1^*$) and the value found in step Ae for $b_f$ and $\theta_f^*$ Ag. establishing the location of the second arc such that the arc passes through the trailing edge using the values known ($b_t$, $\theta_t^*$, $\beta_1^*$) and values found in step Ae for $b_f$, $\theta_f^*$ Ah. establishing the conical chord line $B_t$ extending between the leading edge and the trailing edge, Ai. determining the actual alpha chord angle $\alpha_{cha}$ for the cambered meanline with respect to the forward tangent line TL, Aj. determining the difference E between the actual alpha chord angle $\alpha_{cha}$ and the alpha chord angle $\alpha_{ch}$ used to calculate the normalized location $L_{fcs}$ by substracting $\alpha_{ch}$ from $\alpha_{cha}$ ($E = \alpha_{cha} - \alpha_{ch}$), Ak. proceeding to step B if the absolute value of E is less than a predetermined value e ($|E| < e$) and proceeding to step Am if the absolute value of E is greater than or equal to the predetermined value e ($|E| \geq e$), Al. setting the value of the alpha chord angle $\alpha_{ch}$ equal to the value $\alpha_{cha}$ ($\alpha_{ch} = \alpha_{cha}$), Am. repeating steps Ac through Aj.

The predetermined value e is selected such that any variation in the quantities TERG, $b_f/b_t$, loc mt/$b_t$ and $\theta_f^*/\theta_t^*$ obtained from FIG. 6 is less than $\pm 0.02$.

Figure 7:
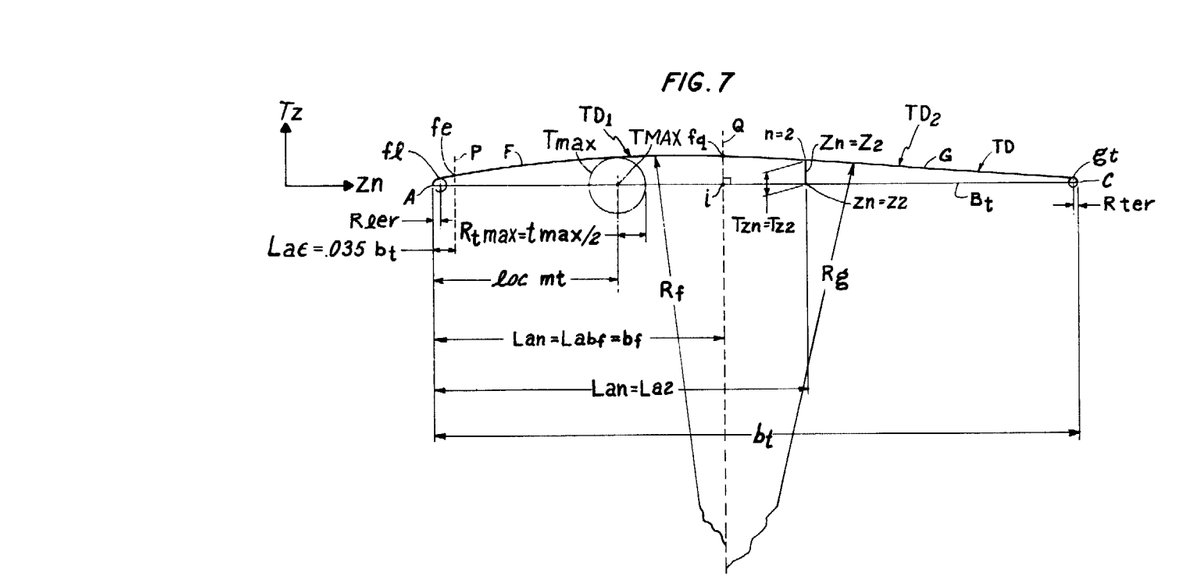
FIG. 7 is a diagrammatic view illustrating the second step of forming a thickness distribution about the conical chord line $B_f$.

FIG. 7 illustrates the second step of forming a thickness distribution TD about the conical chord line $B_t$. The second step is:

B. establishing a thickness distribution TD formed of two parts, each part being disposed about the conical chord line $B_t$, each part having a line spaced a distance Tzn from the conical chord line $B_t$ at any point zn, the point zn being spaced a distance Lan from the leading edge on the conical chord line $B_t$, the distance Tzn being measured along a line Zn perpendicular to the conical chord line $B_t$, the line of the first part being TD$_1$ and the line of the second part being TD$_2$, Ba. the line of the first part TD$_1$ being established by Ba1. determining the distance loc mt along the conical chord line to the location TMAX of maximum thickness $t_{max}$ by determining the ratio loc mt/$b_t$ from FIG. 6 at the value $L_{fcs}$ of the normalized distance to the first covered section, Ba2. superimposing on the conical chord line $B_t$ a circle $T_{max}$ having a center on the conical chord line a distance equal to loc mt from point A and a radius $R_{tmax}$ equal to one-half of the maximum thickness $t_{max}$ of the airfoil section ($R_{tmax} = t_{max}/2$).

Ba3. establishing on the conical chord line $B_t$ a leading edge radius circle having a radius $R_{ler}$ and a center on $B_t$ a distance equal to $R_{ler}$ from the leading edge and intersecting the leading edge at a point A, the radius $R_{ler}$ being equal to the quantity eighteen hundred and fifty-two ten thousandths (0.1852) multiplied by the maximum thickness $t_{max}$ ($R_{ler}=0.1852 \cdot t_{max}$), Ba4. establishing a line Q perpendicular to the conical chord line $B_t$ at a point which is a distance $b_f$ (Lan=$b_f$) from the leading edge.

Figure 8:
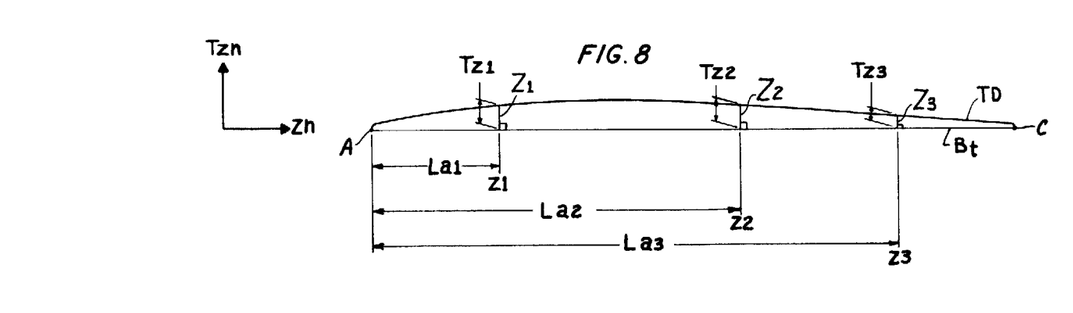
FIG. 8 is a diagrammatic view corresponding to the diagrammatic view of FIG. 7.

Ba5. establishing a line F having a radius of curvature $R_f$ which is tangent to the leading edge circle at a point fl, tangent to the circle $T_{max}$ and which intersects the line Q at a point fq, Ba6. establishing a line P perpendicular to the conical chord line $B_t$ at a point which is a distance Lan equal to the quantity thirty-five thousandths multiplied by the length $b_t$ of the conical chord line (Lan=$0.035b_t$) from the leading edge and which intersects the line F at a point fe, Ba7. passing the line $TD_1$ of the first part through the points A, fe and fq such that the line of the first part is tangent to the leading edge radius circle at point A, tangent to the line F at point fe and coincident with line F between the points fe and fq, Bb. the line of the second part $TD_2$ being established by Bb1. determining the quantity TERG from FIG. 6 at the value $L_{fcs}$ of the normalized distance to the first covered section and determining the radius $R_{ter}$ which is equal to the quantity TERG multiplied by four hundred and sixty-three thousandths (0.463) and by $t_{max}$ ($R_{ter}=$ TERG$\cdot 0.463 \cdot t_{max}$), Bb2. establishing on the conical chord line $B_t$ a trailing edge radius circle having a radius $R_{ter}$ and a center on $B_t$ spaced a distance equal to $R_{ter}$ from the trailing edge and intersecting the trailing edge at the point C, Bb3. establishing a line G having a radius of curvature Rg which is tangent to the trailing edge radius circle at a point gt and which is tangent to the line F at the point fq, Bb4. passing the line of the second part $TD_2$ through the points c, gt and fq, such that the line of the second part is coincident with the trailing edge radius circle between the points C and gt and coincident with the line G between the points gt and fq, FIG. 8 shows the thickness distribution TD generated by the preceding step B. The thickness distribution is disposed about the conical chord line $B_t$ of length $b_t$. At point A on the leading edge, the thickness Tzn is equal to zero (Tzn=Tza=0). At point C on the trailing edge, the thickness is equal to zero (Tzn=Tzc=0). At point $z_1$ (n−1) a distance $La_1$ from the leading edge A as measured along the conical chord line $B_t$ (Lan=$La_1$), the thickness is equal to $Tz_1$. The distance $Tz_1$ is measured along a line $Z_1$ perpendicular to $B_t$. Similarly, the thickness of the thickness distribution is equal to $Tz_2$ at point $z_2$ a distance $La_2$ from the leading edge and $Tz_3$ at point $z_3$ a distance $La_3$ from the leading edge.

Figure 9:
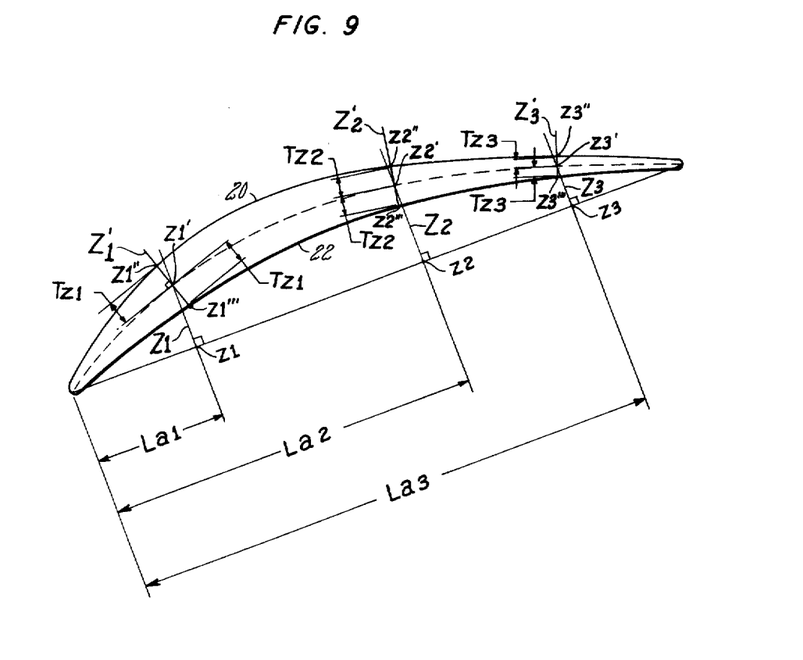
FIG. 9 is a diagrammatic view illustrating the step of applying the thickness distribution of FIG. 9 to the cambered meanline of FIG. 6.

FIG. 9 illustrates the third step of applying (superimposing) the thickness distribution on the cambered meanline to form a convex surface 20 (suction surface) and a concave surface 22 (pressure surface) of the airfoil section. The third step is step:

C. superimposing the thickness distribution on the cambered meanline by

Ca. establishing a plurality of points $z_n'$, each point $z_n'$ being at the intersection of the line Zn and the cambered meanline, Cb. establishing a line $Z_n'$ perpendicular to the cambered meanline at each point $z_n'$, Cc. establishing a point $z_n''$ at a distance Tzn as measured along the line $Z_n'$ from the convex side of the cambered meanline at each point $z_n'$ and a point $z_n'''$ at a distance Tzn as measured along the line $Z_n'$ from the concave side of the cambered meanline at each point $z_n'$, Cd. establishing a concave surface passing through the leading edge and the trailing edge and through all points $z_n''$, Ce. establishing a convex surface passing through the leading edge and the trailing edge and through all points $z_n'''$.

As shown in FIG. 9, the distance between points $z_1''$ and $z_2''$ is larger than the distance between points $z_1$ and $z_2$ on the conical chord line $B_t$. Thus, the thickness distribution TD about the conical chord line $B_t$ is stretched chordwisely on the convex side. The distance between the points $z_1'''$ and $z_2'''$ is smaller than the distance between the points $z_1$ and $z_2$ on the conical chord line $B_t$. Thus, the thickness distribution TD about the conical chord line $B_t$ is compressed chordwisely on the concave side.

an airfoil having a desired separation characteristic in a transonic aerodynamic flow field results from forming an airfoil section having a cambered meanline, a convex surface and a concave surfaces as established in steps A, B, C and combining these sections to form an airfoil. The airfoil is formed in any suitable manner, such as by casting or casting and machining. The conical airfoil section 28 as shown in FIG. 4 has:

a convex surface 20, a concave surface 22 joined to the convex surface at the leading edge 24 and the trailing edge 26, wherein the ratio of the front camber angle $\theta_f^*$ to the total camber angle $\theta_t^*$ is related to both the alpha chord angle $\alpha_{ch}$ and the gap to chord ratio $\tau/b_t$ by curve $\theta_f^*/\theta_t^*$ of FIG. 6, wherein the ratio of the length $b_f$ of the chord $B_f$ to the length $b_t$ of the conical chord $B_t$ is related to both the alpha chord angle $\alpha_{ch}$ and the gap to chord ratio $\tau/b_t$ by curve $b_f/b_t$ of FIG. 6, wherein the ratio between the length loc mt to the location of maximum thickness and the length $b_t$ of the conical chord $B_t$ is related to both the alpha chord angle $\alpha_{ch}$ and the gap to chord ration $\tau/b_t$ by curve loc mt/$b_t$ of FIG. 6, wherein the concave surface of the airfoil section and the convex surface of the airfoil section are each spaced a distance Tzn from any point zn perpendicular to the cambered meanline, and wherein the distance Tzn is defined by a thickness distribution TD formed of two parts generated about the conical chord line $B_t$, each part at any point $z_n'$ having a line spaced the distance Tzn from the conical chord line $B_t$ as measured along a line Zn perpendicular to the conical chord line $B_t$ passing through the point $z_n'$ and a point zn, the point zn being spaced a distance Lan from a point A on the leading edge along the conical chord line $B_t$, the line of the first part being $TD_1$ and the line of the second part being $TD_2$ such that A. the line $TD_1$ of the first part A1. intersects the leading edge at the point A, A2. is tangent at the point A to a circle passing through the point A the circle having a center on the conical chord line $B_t$, and a radius $R_{ler}$, the radius $R_{ler}$ being equal to the quantity eighteen hundred and fifty-two thousandths (0.1852) multiplied by the maximum thickness $T_{max}$ of the airfoil ($R_{ler} = 0.1852 \cdot t_{max}$), A3. is tangent to a circle having a center at the location of maximum thickness TMAX on $B_t$ a distance loc mt from the point A (Lan=loc mt) and having a radius $R_{tmax}$ equal to one-half of the maximum thickness $t_{max}$ of the airfoil section ($R_{tmax} = t_{max}/2$), A4. is coincident with a line F at a point fe, the line F being tangent to the circle having a radius $R_{ler}$ at a point fl, being tangent to the circle $T_{max}$ and having a radius of curvature $R_f$, the point fe being spaced from point A as measured along the conical chord line $B_t$ a distance equal to the quantity thirty-five thousandths multiplied by the distance $b_t$(Lan=La$\epsilon$=0.035$b_t$), A5. terminates at a point fq, the point fq being the point of intersection between the line of the first part $TD_1$ and a line Q, the line Q being perpendicular to the conical chord line $B_t$ at a point which is a distance $b_t$(Lan=$b_f$) from the leading edge, and A6. has a radius of curvature $R_f$ between the point fe and the point fq; and B. the line $TD_2$ of the second part
B1. is tangent to the line of the first part at the point fq,
B2. extends from the point fq having a radius of curvature Rg,
B3. is tangent at a point gt to a circle passing through a point C on the trailing edge the circle having a center on the conical chord line $B_t$ and a radius $R_{ter}$, the radius $R_{ter}$ being equal to the quantity TERG multiplied by four hundred and sixty-three thousandths and multiplied by the maximum thickness of the airfoil $t_{max}$ ($R_{ter} = $ TERG$\cdot 0.463 \cdot t_{max}$),
B4. is coincident with the circle having the radius $R_{ter}$ between the point gt and the point C.

Figure 10:
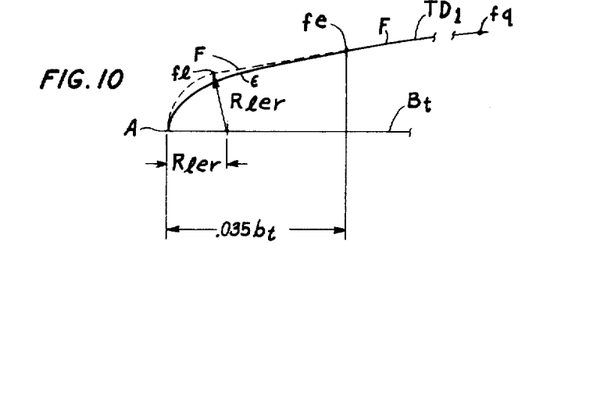
FIG. 10 is a diagrammatic view of the leading edge region of the thickness distribution shown in the FIG. 7 and FIG. 8 views.

Lines $TD_1$ within the purview of this invention are characterized by: coincidence with the line F between the points fe and fq; and, tangency between the points fe and A to the line F and to the circle having a radius $R_{ler}$. An example of such a line is the broken line $TD_1$ shown in FIG. 10. This line is coincident with the line F between fl and fq and coincident between points fl and A with the circle $R_{ler}$. Another example of such a line is a line having a linear portion and curved portions at regions near the point fl and the point A. A third example is shown by the solid line in FIG. 10. The solid line $TD_1$ is an elliptical line extending between the points A and fe. The method for establishing the first part $TD_1$ of the thickness distribution for the elliptical line includes the steps of:

Ba8. establishing an elliptical line $\epsilon$ which is tangent to the line F at the point fe and tangent to the leading edge radius circle at point A, Ba9. passing the line of the first part through the point fe such that the line of the first part is coincident with the elliptical line $\epsilon$ between the point A and the point fe.

Accordingly, the line $TD_1$ of the first part is coincident with an elliptical line $\epsilon$. The elliptical line is tangent at point A to the circle having a radius $R_{ler}$. The elliptical line has a radius of curvature equal to $R_f$ at the point fe and extends between the point A and the point fe. Such an elliptical line minimizes the discontinuity in curvature at the point of tangential juncture with the line F as compared with the discontinuity in curvature at the point of tangential juncture between a circle and the line F.

The airfoil section which results from the application of this method will perform better in a transonic aerodynamic flow field than a corresponding circular arc airfoil for any given application. This airfoil section is intended for a specific range of Mach numbers from approximately seven tenths M to nine tenths M (0.7M–0.9M). The airfoil section obtains its superior behavior from the contour of the suction surface. The contour of the suction surface affects diffusion of the working medium flow along the suction surface of a compressor stage in such a way that there is an equal risk of separating the boundary layer at every point chordwisely. Such a distribution of diffusion avoids a shock wave and the resultant recompression. Thus, the airfoil avoids the losses occurring with the shock wave and the losses associated with separating the flow.

Although airfoils designed to the above criteria have particular utility in transonic flow fields, such airfoils also have utility in subsonic flow fields and are within the scope of the teaching contained herein.

Although the invention has been shown and described with respect to preferred embodiments thereof, it should be understood by those skilled in the art that various changes and omissions in the form and detail thereof may be made therein without departing from the spirit and the scope of the invention.

We claim:

1. In a gas turbine engine of the type having an array of airfoils the array being formed of arrays of conical airfoil sections each array of conical airfoil sections having a plurality of airfoil sections spaced circumferentially from a circumferentially adjacent airfoil section a distance tau ($\tau$) leaving a gap therebetween, said airfoil section having a leading edge, a trailing edge, a front camber angle ($\theta_f^*$), a total camber angle $\theta_t^*$, an inlet metal angle ($\beta_1^*$), an exit metal angle ($\beta_2^*$), a maximum thickness $t_{max}$, a length to the location of maximum thickness (loc mt), a cambered double circular arc meanline terminating at the leading edge and the trailing edge, and having a conical chord $B_t$ extending between the leading edge and the trailing edge having a length $b_t$, an alpha chord angle ($\alpha_{ch}$) between $B_t$ and a tangent line TL passing through the leading edge, a front chord having a length $b_f$, and a gap to chord ratio ($\tau/b_t$), the improvement which comprises:

a plurality of conical airfoil sections in each airfoil, each of said sections having
a convex surface;
a concave surface joined to the convex surface at the leading edge and the trailing edge;
wherein the ratio of the front camber angle $\theta_f^*$ to the total camber angle $\theta_t^*$ is related to both the alpha chord angle $\alpha_{ch}$ and the gap to chord ratio $\tau/b_t$ by a curve $\theta_f^*/\theta_t^*$;
wherein the ratio of the length $b_f$ of the front chord $B_f$ to the length $b_t$ of the conical $B_t$ is related to both the alpha chord angle $\alpha_{ch}$ and the gap to chord ratio $\tau/b_t$ by a curve $b_f/b_t$;
wherein the ratio between the length loc mt to the location of maximum thickness and the length $b_t$ of the conical chord $B_t$ is related to both the alpha chord angle $\alpha_{ch}$ and the gap to chord ratio $\tau/b_t$ by a loc $mt/b_t$;

wherein the concave surface of the airfoil section and the convex surface of the airfoil section are each spaced a distance Tzn from any point zn' perpendicular to the cambered meanline; and wherein the distance Tzn is defined by a thickness distribution TD formed of two parts generated about the conical chord line $B_t$, each part at any point zn having a line spaced the distance Tzn from the conical chord line $B_t$ as measured along a line Zn perpendicular to the conical chord line $B_t$ passing through the point zn' and a point zn, the point zn being spaced a distance Lan from a point A on the leading edge along the conical chord line $B_t$, the line of the first part being $TD_1$ and the line of the second part being $TD_2$ such that A. the line $TD_1$ of the first part
  A1. intersects the leading edge at the point A,
  A2. is tangent at the point A to a circle passing through the point A the circle having a center on the conical chord line $B_t$, and a radius $R_{ler}$, the radius $R_{ler}$ being equal to the quantity eighteen hundred and fifty-two thousandths (0.1852) multiplied by the maximum thickness $t_{max}$ of the airfoil ($R_{ler}=0.1852.t_{max}$),
  A3. is tangent to a circle having a center at the location of maximum thickness TMAX on $B_t$ a distance loc mt from the point A (Lan=loc mt) and having a radius $R_{tmax}$ equal to one half of the maximum thickness $t_{tmax}$ of the airfoil section ($R_{tmax}=t_{max}/2$),
  A4. is coincident with a line F at a point fe, the line F being tangent to the circle having a radius $R_{ler}$ at a point fl, being tangent to the circle $T_{max}$ and having a radius of curvature $R_f$, the point fe being spaced from point A as measured along the conical chord line $B_t$ a distance equal to the quantity thirty-five thousandths multiplied by the distance $b_t$(Lan=-La$\epsilon$=0.035.$b_t$),
  A5. terminates at a point fq, the point fq being the point of intersection between the line of the first part $TD_1$ and a line Q, the line Q being perpendicular to the conical chord line $B_t$ at a point which is a distance $b_t$(Lan=$b_f$) from the leading edge, and
  A6. has a radius of curvature $R_f$ between the point fe and the point fq; and
B. the line $TD_2$ of the second part
  B1. is tangent to the line of the first part at the point fq,
  B2. extends from the point fq having a radius of curvature Rg,
  B3. is tangent at a point gt to a circle passing through a point C on the trailing edge the circle having a center on the conical chord line $B_t$ and a radius $R_{ter}$, the radius $R_{ter}$ being equal to the quantity TERG multiplied by four hundred and sixty-three thousandths and multiplied by the maximum thickness of the airfoil $t_{max}$ ($R_{ter}=TERG.0.463.t_{max}$),
  B4. is coincident with the circle having the radius $R_{ter}$ between the point gt and the point C.

2. The conical airfoil section of claim 1 wherein the line $TD_1$ of the first part is coincident with an elliptical line $\epsilon$, the elliptical line being tangent at point A to the circle having a radius $R_{ler}$ and having a radius of curvature equal to $R_f$ at the point fe, the point fe lying between the point fl and the point fq wherein the elliptical line extends between the point A and the point fe.

3. A method for forming an airfoil section of a plurality of airfoil sections which are circumferentially spaced a distance tau $\tau$ apart about a rotor axis each of the airfoil sections having an inlet metal angle $\beta_1^*$, a total camber angle $\theta_t^*$, an alpha chord angle $\alpha_{ch}$, a maximum thickness $t_{max}$, a leading edge, a trailing edge, a tangent line TL passing through the leading edge tangent to the path of rotation, a front chord line $B_f$ of length $b_f$, a conical chord line $B_t$ of length $b_t$ wherein the values of $\beta_1^*$, $\theta_t^*$, $\tau$, $b_t$, the maximum thickness of the airfoil section $t_{max}$, are known, comprising the steps of:

A. establishing a cambered meanline having a concave side and a convex side and having a first arc, a second arc and a transition point TP between the first arc and the second arc, the first arc being tangent to the second arc at said transition point TP by
  Aa. determining an initial value for the alpha chord angle ($\alpha_{chi}$) which is equal to the sum of the inlet metal angle ($\beta_1^*$) and one-half of the total camber angle ($\theta_t^*$)/=, ($\alpha_{chi}=\beta_1^*+\theta_t^*$)/2,
  Ab. setting the value of the alpha chord angle chi ($\alpha_{ch}=\alpha_{chi}$),
  Ac. determining a distance l from the tangent line TL to the first covered section as measured along the conical chord line $B_t$, the distance l being equal to the distance tau $\tau$ multiplied by the quantity the sine of the angle ninety degrees minus the alpha cord angle (l=$\tau$.sin(90-$\alpha_{ch}$),
  Ad. determining the normalized distance $L_{fcs}$ to the first covered section by dividing the distance l by the distance $b_t$,
  Ae. obtaining the raio of the length $b_f$ of the front chord line $B_f$ to the length $b_t$ of the conical chord line $B_t(b_f/b_t)$ and the ratio of the front camber angle ($\theta_f^*$) to the total camber angle $\theta_t^*(\theta_f^*/\theta_t^*)$ from FIG. 6 at the value $L_{fcs}$ of the normalized distance to the first covered section,
  Af. establishing the location of the first arc such that the arc passes through the leading edge using the values known ($b_t$, $\theta_t^*$, $\beta_1^*$) and the value found in step Ae. for $b_f$ and $\theta_f^*$,
  Ag. establishing the location of the second arc such that the arc passes through the trailing edge using the values known ($b_t$, $\theta_t^*$, $\beta_1^*$) and values found in step Ae. for $b_f$, $\theta_f^*$,
  Ah. establishing a conical chord line $B_t$ extending between the leading edge and the trailing edge,
  Ai. determining the actual alpha chord angle $\alpha_{cha}$ for the cambered meanline,
  Aj. determining the difference E between the actual alpha chord angle $\alpha_{cha}$ and the alpha chord angle $\alpha_{ch}$ used to calculate the normalized location $L_{fcs}$ by substracting $\alpha_{ch}$ from $\alpha_{cha}$ (E=$\alpha_{cha}-\alpha_{ch}$),
  Ak. proceeding to step B if the absolute value of E is less than the predetermined value e ($|E|<e$) and proceeding to step Am if the absolute value of E is greater than or equal to the predetermined value e ($|E|\geq e$),
  Al. setting the value of the alpha chord angle $\alpha_{ch}$ equal to the value $\alpha_{cha}$ ($\alpha_{ch}=\alpha_{cha}$), Am. repeating steps Ac through Aj.

B. establishing a thickness distribution TD formed of two parts each part being disposed about the conical chord line $B_t$, each part having a line spaced Tzn from the conical chord line $B_t$ at any point zn, the point zn being spaced a distance Lan from the leading edge on the conical chord line $B_t$, the distance Tzn being measured along a line Zn perpendicular to the conical chord line $B_t$, the line of the first part being $TD_1$ and the line of the second part being $TD_2$, Ba. the line of the first part $TD_1$ being established by Ba1. determining the distance loc mt along the conical chord line to the location TMAX of maximum thickness $t_{max}$ by determining the ratio loc mt/$b_t$ from FIG. 6 at the value $L_{fcs}$ of the normalized distance to the first covered section, Ba2. superimposing on the conical chord line $B_t$ a circle $T_{max}$ having a center on the conical chord line a distance equal to loc mt from point A and a radius $R_{tmax}$ equal to one-half of the maximum thickness $t_{max}$ of the airfoil section ($R_{tmax} = t_{max}/2$).

Ba3. establishing on the conical chord line $B_t$ a leading edge radius circle having a radius $R_{ler}$ and a center on $B_t$ a distance equal to $R_{ler}$ from the leading edge and intersecting the leading edge at a point A, the radius $R_{ler}$ being equal to the quantity eighteen hundred and fifty-two ten thousandths (0.1852) multiplied by the maximum thickness $t_{max}$ ($R_{ler} = 0.1852 \cdot t_{max}$), Ba4. establishing a line Q perpendicular to the conical chord line $B_t$ at a point which is a distance $b_f$ (Lan = $b_f$) from the leading edge, Ba5. establishing a line F having a radius of curvature $R_f$ which is tangent to the leading edge circle at a point fl, tangent to the circle $T_{max}$ and which intersects the line Q at a point fq, Ba6. establishing a line P perpendicular to the conical chord line $B_t$ at a point which is a distance Lan equal to the quantity thirty-five thousandths multiplied by the length $b_t$ of the conical chord line (Lan = $0.035 b_t$) from the leading edge and which intersects the line F at a point fe, Ba7. passing the line $TD_1$ of the first part through the points A, fe and fq such that the line of the first part is tangent to the leading edge radius circle at point A, tangent to the line F at point fe and coincident with line F between the points fe and fq, Bb. the line of the second part $TD_2$ being established by Bb1. determining the quantity TERG from FIG. 6 at the value $L_{fcs}$ of the normalized distance to the first covered section and determining the radius $R_{ter}$ which is equal to the quantity TERG multiplied by four hundred and sixty-three thousandths (0.463) and by $t_{max}$ ($R_{ter}$ = TERG $\cdot 0.463 \cdot t_{max}$), Bb2. establishing on the conical chord line $B_t$ a trailing edge radius circle having a radius $R_{ter}$ and a center on $B_t$ spaced a distance equal to $R_{ter}$ from the trailing edge and intersecting the trailing edge at a point C, Bb3. establishing a line G having a radius of curvature Rg which is tangent to the trailing edge radius circle at a point gt and which is tangent to the line F at the point fq, Bb4. passing the line of the second part $TD_2$ through the points C, gt and fq, such that the line of the second part is coincident with the trailing edge radius circle between the points C and gt and coincident with the line G between the points gt and fq;

C. superimposing the thickness distribution on the cambered meanline by

Ca. establishing a plurality of points zn', each point zn' being at the intersection of the line Zn and the cambered meanline, Cb. establishing a line Z'n perpendicular to the cambered meanline at each point zn', Cc. establishing a point zn" at a distance Tzn as measured along the line Z'n from the convex side of the cambered meanline at each point zn' and a point zn''' at a distance Tzn as measured along the line Z'n from the concave side of the cambered meanline at each point zn', Cd. establishing a concave surface passing through the leading edge and the trailing edge and through all points zn", Ce. establishing a convex surface passing through the leading edge and the trailing edge and through all points zn''';

D. forming an airfoil section having a cambered meanline, a convex surface and a concave surface as established in steps A, B and C;

wherein the thickness distribution is stretched chordwisely on the convex side and compressed on the concave side to form an airfoil section having desirable separation characteristics in a transonic aerodynamic flow field.

4. The method for forming an airfoil section of claim 3 wherein the step Ba of establishing the first part $TD_1$ of the thickness distribution includes the steps Ba8. establishing an elliptical line $\epsilon$ which is tangent to the line F at the point fe and tangent to the leading edge radius circle at point A, Ba9. passing the line of the first part through the point fe such that the line of the first part is coincident with the elliptical line $\epsilon$ between the point A and the point fe.

5. In a gas turbine engine of the type having an array of airfoils the array being formed of arrays of conical airfoil sections each array of conical airfoil sections having an airfoil section spaced circumferentially from a circumferentially adjacent airfoil section a distance tau ($\tau$) leaving a gap therebetween, said airfoil section having a leading edge, a trailing edge, a front camber angle ($\theta_f^*$), a total camber angle $\theta_t^*$, an inlet metal angle ($\beta_1^*$), an exit metal angle ($\beta_2^*$), a maximum thickness $t_{max}$, a length to the location of maximum thickness (loc mt), a cambered double circular arc meanline terminating at the leading edge and the trailing edge, and having a conical chord $B_t$ extending between the leading edge and the trailing edge having a length $b_t$, an alpha chord angle ($\alpha_{ch}$) between $B_t$ and a tangent line TL passing through the leading edge, a front chord having a length $b_f$, and a gap to chord ratio ($\tau/b_t$), the improvement which comprises:

a conical airfoil section having
a convex surface;
a concave surface joined to the convex surface at the leading edge and the trailing edge;

wherein the ratio of the front chamber angle $\theta_f^*$ to the total chamber angle $\theta_t^*$ is related to both the alpha chord angle $\alpha_{ch}$ and the gap to chord ratio $\tau/b_t$ by curve $\theta_f^*/\theta_t^*$ of FIG. 6;

wherein the ratio of the length $b_f$ of the front chord $B_f$ to the length $b_t$ of the conical $B_t$ is related to both the alpha chord angle $\alpha_{ch}$ and the gap to chord ratio $\tau/b_t$ by curve $b_f/b_t$ of FIG. 6;

wherein the ratio between the length loc mt to the location of maximum thickness and the length $b_t$ of the conical chord $B_t$ is related to both the alpha chord angle $\alpha_{ch}$ and the gap to chord ratio $\tau/b_t$ by curve loc $mt/b_t$ of FIG. 6;

wherein the concave surface of the airfoil section and the convex surface of the airfoil section are each spaced a distance Tzn from any point zn' perpendicular to the chambered meanline; and wherein the distance Tzn is defined by a thickness distribution TD formed of two parts generated about the conical chord line $B_t$, each part at any point zn having a line spaced the distance Tzn from the conical chord line $B_t$ as measured along a line Zn perpendicular to the conical chord line $B_t$ passing through the point zn' and a point zn, the point zn being spaced a distance Lan from a point A on the leading edge along the conical chord line $B_t$, the line of the first part being $TD_1$ and the line of the second part being $Td_2$ such that A. the line $TD_1$ of the first part
  A1. intersects the leading edge at the point A,
  A2. is tangent at the point A to a circle passing through the point A the circle having a center on the conical chord line $B_t$, and a radius $R_{ler}$, the radius $R_{ler}$ being equal to the quantity eighteen hundred and fifth-two thoundandths (0.1852) multipled by the maximum thickness $t_{max}$ of the airfoil ($R_{ler} = 0.1852 \cdot t_{max}$),
  A3. is tangent to a circle having a center at the location of maximum thickness TMAX on $B_t$ a distance loc mt from the point A (Lan=loc mt) and having a radius ($R_{tmax}$ equal to one half of the maximum thickness $t_{max}$ of the airfoil section ($R_{tmax} = t_{max}/2$),
  A4. is coincident with a line F at a point fe, the line F being tangent to the circle having a radius $R_{ler}$ at a point fl, being tangent to the circle $T_{max}$ and having a radius of curvature $R_f$, the point fe being spaced from point A as measured along the conical chord line $B_t$ a distance equal to the quantity thirty-five thousandths multiplied by the distance $b_t$ (Lan=-La$\epsilon$=0.035.$b_t$),
  A5. terminates at a point fq, the point fq being the point of intersection between the line of the first part $TD_1$ and a line Q, the line Q being perpendicular to the conical chord line $B_t$ at a point which is a distance $b_f$(Lan=$b_f$) from the leading edge, and
  A6. has a radius of curvature $R_f$ between the point fe and the point fq; and B. the line $TD_2$ of the second part
  B1. is tangent to the line of the first part at the point fq,
  B2. extends from the point fq having a radius of curvature Rg,
  B3. is tangent at a point gt to a circle passing through a point C on the trailing edge the circle having a center on the conical chord line $B_t$ and a radius $R_{ter}$, the radius $R_{ter}$ being equal to the quantity TERG multiplied by four hundred and sixty-three thousandths and multiplied by the maximum thickness of the airfoil $t_{max}$ ($R_{ter} = TERG \cdot 0.463 \cdot t_{max}$),
  B4. is coincident with the circle having the radius $R_{ter}$ between the point gt and the point C.

6. The conical airfoil section of claim 5 wherein the line $TD_1$ of the first part is coincident with an elliptical line $\epsilon$, the elliptical line being tangent at point A to the circle having a radius $R_{ler}$ and having a radius of curvature equal to $R_f$ at the point fe, the point fe lying between the point fl and the point fq wherein the elliptical line extends between the point A and the point fe.

7. A rotor blade having one or more airfoil sections, each airfoil section being one of a plurality of airfoil sections which are circumferentially spaced a distance tau ($\tau$) apart about a rotor axis, each airfoil section having an inlet metal angle $\beta_1^*$, a total camber angle $\theta_t^*$, an alpha chord angle $\alpha_{ch}$, a maximum thickness $t_{max}$, a leading edge, a trailing edge, a tangent line TL passing through the leading edge tangent to the path of rotation, a front chord line $B_f$ of length $b_f$, and a conical chord line $B_t$ of length $b_t$ wherein the values of $B_1^*$, $\theta_t^*$, $\tau$, $b_t$, the maximum thickness of the airfoil section $t_{max}$, are known, the rotor blade having one or more airfoil section geometries determined by the method steps of:

A. establishing a cambered meanline having a concave side and a convex side and having a first arc, a second arc and a transition point TP between the first arc and the second arc, the first arc being tangent to the second arc at said transition point TP by Aa. determining an initial value for the alpha chord angle ($\alpha_{chi}$) which is equal to the sum of the inlet metal angle ($\beta_1^*$) and one-half of the total camber angle ($\theta_t^*/2$), ($\alpha_{chi} = \beta_1^* + \theta_t^*/2$),
  Ab. setting the value of the alpha chord angle $\alpha_{chi}$ ($\alpha_{ch} = \alpha_{chi}$),
  Ac. determining a distance l from the tangent line TL to the first covered section as measured along the conical chord line $B_t$, the distance l being equal to the distance tau $\tau$ multiplied by the quantity the sine of the angle ninety degrees minus the alpha chord angle ($l = \tau \cdot \sin(90 - \alpha_{ch})$,
  Ad. determining the normalized distance $L_{fcs}$ to the first covered section by dividing the distance l by the distance $b_t$,
  Ae. obtaining the ratio of the length $b_f$ of the front chord line $B_f$ to the length $b_t$ of the conical chord line $B_t$ ($b_f/b_t$) and the ratio of the front camber angle ($\theta_f^*$) to the total camber angle $\theta_t^*$ ($\theta_f^*/\theta_t^*$) as a function of the value $L_{fcs}$ of the normalized distance to the first covered section,
  Af. establishing the locations of the first arc such that the arc passes through the leading edge using the values known ($b_t$, $\theta_t^*$, $\beta_1^*$) and the value found in step Ae. for $b_f$ and $\theta_f^*$,
  Ag. establishing the location of the second arc such that the arc passes through the trailing edge using the values known ($b_t$, $\theta_t^*$, $\beta_1^*$) and values found in step Ae. for $b_f$, $\theta_f^*$,
  Ah. establishing a conical chord line $B_t$ extending between the leading edge and the trailing edge,
  Ai. determining the actual alpha chord angle $\alpha_{cha}$ for the cambered meanline, Aj. determining the difference E between the actual alpha chord angle $\alpha_{cha}$ and the alpha chord angle $\alpha_{ch}$ used to calculate the normalized location $L_{fcs}$ by subtracting $\alpha_{ch}$ from $\alpha_{cha}$ (E=$\alpha_{cha}-\alpha_{ch}$), Ak. proceeding to step B if the absolute value of E is less than the predetermined value e ($|E|<e$) and proceeding to step Am if the absolute value of E is greater than or equal to the predetermined value e ($|E|\geq e$), Al. setting the value of the alpha chord angle $\alpha_{ch}$ equal to the value $\alpha_{cha}$ ($\alpha_{ch}=\alpha_{cha}$), Am. repeating steps Ac through Aj, B. establishing a thickness distribution TD having a line spaced a distance Tzn from the conical chord line $B_t$ at any point zn, the point zn being spaced a distance Lan from the leading edge on the conical chord line $B_t$, the distance Tzn being measured along a line Zn perpendicular to the conical chord line $B_t$;

C. superimposing the thickness distribution on the cambered meanline by

Ca. establishing a plurality of points zn', each point zn' being at the intersection of the line Zn and the cambered meanline, Cb. establishing a line Z'n perpendicular to the cambered meanline at each point zn', Cc. establishing a point zn'' at a distance Tzn as measured along the line Z'n from the convex side of the cambered meanline at each point zn' and a point zn''' at a distance Tzn as measured along the line Z'n from the concave side of the cambered meanline at each point zn', Cd. establishing a concave surface passing through the leading edge and the trailing edge and through all points zn'', Ce. establishing a convex surface passing through the leading edge and the trailing edge and through all points zn'''.

8. A rotor blade having one or more airfoil sections, each airfoil section being one of a plurality of airfoil sections which are circumferentially spaced a distance tau ($\tau$) apart about a rotor axis each of the airfoil sections having an inlet metal angle $\beta_1^*$, a total camber angle $\theta_t^*$, an alpha chord angle $\alpha_{ch}$, a maximum thickness $t_{max}$, a leading edge, a trailing edge, a tangent line TL passing through the leading edge tangent to the path of rotation, a front chord line $B_f$ of length $b_f$, a conical chord line $B_t$ of length $b_t$ wherein the values of $\beta_1^*$, $\theta_t^*$, $\tau$, $b_t$, the maximum thickness of the airfoil section $t_{max}$, are known, the rotor blade having one or more airfoil section geometries determined by the method steps of:

A. establishing a cambered meanline having a concave side and a convex side and having a first arc, a second arc and a transition point TP between the first arc and the second arc, the first arc being tangent to the second arc at said transition point TP by Aa. determining an initial value for the alpha chord angle ($\alpha_{chi}$) which is equal to the sum of the inlet metal angle ($\beta_1^*$) and one-half of the total camber angle ($\theta_t^*/2$), ($\alpha_{chi}=\beta_1^* + \theta_t^*/2$), Ab. setting the value of the alpha chord angle $\alpha_{chi}$ ($\alpha_{ch}=\alpha_{chi}$), Ac. determining a distance l from the tangent line TL to the first covered section as measured along the conical chord line $B_t$, the distance l being equal to the distance tau $\tau$ multiplied by the quantity the sine of the angle ninety degrees minus the alpha chord angle (l=$\tau.\sin(90-\alpha_{ch})$), Ad. determining the normalized distance $L_{fcs}$ to the first covered section by dividing the distance l by the distance $b_t$, Ae. obtaining the ratio of the length $b_f$ of the front chord line $B_f$ to the length $b_t$ of the conical chord line $B_t$ ($b_f/b_t$) and the ratio of the front camber angle ($\theta_f^*$) to the total camber angle $\theta_t^*(\theta_f^*/\theta_t^*)$ from FIG. 6 at the value $L_{fcs}$ of the normalized distance to the first covered section.

Af. establishing the location of the first arc such that the arc passes through the leading edge using the values known ($b_t$, $\theta_t^*$, $\beta_1^*$) and the value found in step Ae. for $b_f$ and $\theta_f$, Ag. establishing the location of the second arc such that the arc passes through the trailing edge using the values known ($b_t$, $\theta_t^*$, $\beta_1^*$) and values found in step Ae. for $b_f$, $\theta_f^*$, Ah. establishing a conical chord line $B_t$ extending between the leading edge and the trailing edge, Ai. determining the actual alpha chord angle $\alpha_{cha}$ for the cambered meanline, Aj. determining the difference E between the actual alpha chord angle $\alpha_{cha}$ and the alpha chord angle $\alpha_{ch}$ used to calculate the normalized location $L_{fcs}$ by substracting $\alpha_{ch}$ from $\alpha_{cha}$ (E=$\alpha_{cha}-\alpha_{ch}$), Ak. proceeding to step B is the absolute value of E is less than the predetermined value e ($|E|<e$) and proceeding to step Am if the absolute value of E is greater than or equal to the predetermined value e ($|E|\geq e$), Al. setting the value of the alpha chord angle $\alpha_{ch}$ equal to the value $\alpha_{cha}$ ($\alpha_{ch}=\alpha_{cha}$), Am. repeating steps Ac through Aj.

B. establishing a thickness distribution TD formed of two parts each part being disposed about the conical chord line $B_t$, each part having a line spaced Tzn from the conical chord line $B_t$ at any point zn, the point zn being spaced a distance Lan from the leading edge on the conical chord line $B_t$, the distance Tzn being measured along a line Zn perpendicular to the conical chord line $B_t$, the line of the first part being $TD_1$ and the line of the second part being $TD_2$, Ba. the line of the first part $TD_1$ being established by Ba1. determining the distance loc mt along the conical chord line to the location TMAX of maximum thickness $t_{max}$ by determining the ratio loc mt/$b_t$ as a function of the value $L_{fcs}$ of the normalized distance to the first covered section, Ba2. superimposing on the conical chord line $B_t$ a circle $T_{max}$ having a center on the conical chord line a distance equal to loc mt from point A and a raduis $R_{tmax}$ equal to one-half of the maximum thickness $t_{max}$ of the airfoil section ($R_{tmax}=T_{max}/2$).

Ba3. establishing on the conical chord line $B_t$ a leading edge radius circle having a radius $R_{ler}$ and a center on $B_t$ a distance equal to $R_{ler}$ from the leading edge and intersecting the leading edge at a point A, the radius $R_{ler}$ being equal to a first constant k multiplied by the maximum thickness $t_{max}$ ($R_{ler}=k \cdot t_{max}$), Ba4. establishing a line Q perpendicular to the conical chord line $B_t$ at a point which is a distance $b_f$ ($Lan=b_f$) from the leading edge, Ba5. establishing a line F having a radius of curvature $R_f$ which is tangent to the leading edge circle at a point fl, tangent to the circle $T_{max}$ and which intersects the line Q at a point fq, Ba6. establishing a line P perpendicular to the conical chord line $B_t$ at a point which is a distance Lan equal to a second constant $k_2$ multiplied by the length $b_t$ of the conical chord line ($Lan=k_2 \cdot b_t$) from the leading edge and which intersects the line F at a point fe, Ba7. passing the line $TD_1$ of the first part through the points A, fe and fq such that the line of the first part is tangent to the leading edge radius circle at point A, tangent to the line F at point fe and coincident with line F between the points fe and fq, Bb. the line of the second part $TD_2$ being established by Bb1. determining the quantity TERG as a function of the value $L_{fcs}$ of the normalized distance to the first covered section and determining the radius $R_{ter}$ which is equal to the quantity TERG multiplied by a third constant $k_3$ and by $t_{max}$ ($R_{ter}=TERG.0.463.t_{max}$), Bb2. establishing on the conical chord line $B_t$ a trailing edge radius circle having a radius $R_{ter}$ and a center on $B_t$ spaced a distance equal to $R_{ter}$ from the trailing edge and intersecting the trailing edge at a point C, Bb3. establishing a line G having a radius of curvature Rg which is tangent to the trailing edge radius circle at a point gt and which is tangent to the line F at the point fq, Bb4. passing the line of the second part $TD_2$ through the points C, gt and fq, such that the line of the second part is coincident with the trailing edge radius circle between the points C and gt and coincident with the line G between the points gt and fq;

C. superimposing the thickness distribution on the cambered meanline by

Ca. establishing a plurality of points zn', each point zn' being at the intersection of the line Zn and the cambered meanline, Cb. establishing a line Z'n perpendicular to the cambered meanline at each point zn', Cc. establishing a point zn'' at a distance Tzn as measured along the line Z'n from the convex side of the cambered meanline at each point zn' and a point zn''' at a distance Tzn as measured along the line Z'n from the concave side of the cambered meanline at each ont zn', Cd. establishing a concave surface passing through the leading edge and the trailing edge and through all points zn'', Ce. establishing a convex surface passing through the leading edge and the trailing edge and through all points zn''';

wherein the thickness distribution is stretched chordwisely on the convex side and compressed on the concave side to form an airfoil section having desirable separation characteristics in a transonic aerodynamic flow field.

* * * * *